United States Patent
Gontani et al.

(10) Patent No.: US 11,219,923 B2
(45) Date of Patent: Jan. 11, 2022

(54) METHOD FOR FORMING MULTILAYER COATING FILM

(71) Applicant: KANSAI PAINT CO., LTD., Hyogo (JP)

(72) Inventors: Haruyuki Gontani, Kanagawa (JP); Naoto Yanagidate, Kanagawa (JP); Masashi Kanda, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 0 days.

(21) Appl. No.: 17/215,766

(22) Filed: Mar. 29, 2021

(65) Prior Publication Data
US 2021/0308720 A1    Oct. 7, 2021

(30) Foreign Application Priority Data

Mar. 30, 2020 (JP) .............................. JP2020-059261
Nov. 4, 2020 (JP) .............................. JP2020-184041

(51) Int. Cl.
| | | |
|---|---|---|
| *B05D 7/00* | (2006.01) | |
| *B05D 7/14* | (2006.01) | |
| *B05D 5/06* | (2006.01) | |
| *C09D 5/29* | (2006.01) | |
| *C09D 7/61* | (2018.01) | |
| *C09D 7/41* | (2018.01) | |

(52) U.S. Cl.
CPC ............. *B05D 7/572* (2013.01); *B05D 5/063* (2013.01); *B05D 7/14* (2013.01); *B05D 7/576* (2013.01); *C09D 5/29* (2013.01); *C09D 7/41* (2018.01); *C09D 7/61* (2018.01); *B05D 2320/00* (2013.01); *B05D 2420/01* (2013.01); *B05D 2420/02* (2013.01); *B05D 2420/03* (2013.01); *B05D 2420/04* (2013.01); *B05D 2601/02* (2013.01)

(58) Field of Classification Search
CPC .......... B05D 7/572; B05D 7/576; B05D 7/14
See application file for complete search history.

(56) References Cited

U.S. PATENT DOCUMENTS

| | | | | |
|---|---|---|---|---|
| 4,981,759 | A * | 1/1991 | Nakatani | ............... C09D 5/4473 |
| | | | | 428/626 |
| 8,993,673 | B2 * | 3/2015 | Kitagawa | ........... C08G 18/6659 |
| | | | | 524/507 |
| 2003/0185993 | A1 | 10/2003 | Kamimori et al. | |
| 2015/0218405 | A1 * | 8/2015 | Iwata | .................. C09D 133/066 |
| | | | | 428/423.1 |
| 2016/0200922 | A1 | 7/2016 | Sugamoto et al. | |
| 2018/0231640 | A1 | 8/2018 | Han et al. | |

FOREIGN PATENT DOCUMENTS

| | | |
|---|---|---|
| JP | 2018-132524 | 8/2018 |
| WO | 2010/030970 | 3/2010 |
| WO | 2017/162475 | 9/2017 |
| WO | 2019/142639 | 7/2019 |

OTHER PUBLICATIONS

Extended European Search Report dated Jul. 29, 2021 in corresponding European Patent Application No. 21164598.1.

* cited by examiner

*Primary Examiner* — Dah-Wei D. Yuan
*Assistant Examiner* — Kristen A Dagenais-Englehart
(74) *Attorney, Agent, or Firm* — Wenderoth, Lind & Ponack, L.L.P.

(57) ABSTRACT

This invention provides a method for forming a multilayer coating film, the method comprising forming a multilayer coating film that has excellent blackness, high reflectance of an infrared laser, and excellent coating film performance. The method for forming a multilayer coating film includes forming a first colored coating film containing a titanium oxide pigment, in which the diffuse reflectance at a wavelength of 905 nm or diffuse reflectance at a wavelength of 1550 nm, or both, is 40% or more; forming a second colored coating film containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments; forming a third colored coating film containing a carbon black pigment; and forming a clear coating film; wherein the multilayer coating film has a lightness $L^*(45°)$ of 3 or less and a chroma $C^*(45°)$ of 1 or less, and wherein the diffuse reflectance at a wavelength of 905 nm or the diffuse reflectance at a wavelength of 1550 nm of the multilayer coating film, or both, is 10% or more.

12 Claims, No Drawings

METHOD FOR FORMING MULTILAYER COATING FILM

CROSS-REFERENCE TO RELATED APPLICATIONS

The present application claims priority to the specification of Japan Patent Application No. 2020-059261, filed on Mar. 30, 2020, and the specification of Japan Patent Application No. 2020-184041, filed on Nov. 4, 2020 (the entire disclosures of which are incorporated in the present specification by reference).

TECHNICAL FIELD

The present invention relates to a method for forming a multilayer coating film.

BACKGROUND ART

Autonomous driving is attracting attention as a key technology of next-generation automobile technology. To enable autonomous driving, it is necessary to use various sensing technologies, one of which is LIDAR (Light Detection and Ranging). LIDAR can measure the distance to an object by irradiating it with an infrared laser, and detecting the reflected light returned from the object. Thus, LIDAR is useful as a high-precision sensor for detecting medium and long distances.

For example, PTL 1 discloses a light detection and ranging (LIDAR) device, comprising a light source to emit a light beam to scan a scope of orientations associated with a target scanning zone; a first microelectromechanical system (MEMS) mirror configured to receive and redirect the light beam towards the target scanning zone, wherein the first MEMS mirror is configured to tilt in a plurality of directions with respect to the light source to redirect the light beam in a plurality of angles in the plurality of directions; and a light detector to receive the light beam reflected from one or more objects located within the target scanning zone, wherein the first MEMS mirror is arranged to tilt to redirect the light beam at a plurality of angles, and allows the light detector to receive the light beam reflected at a plurality of angles to obtain a multiple angular resolution of the one or more objects.

CITATION LIST

Patent Literature

PTL 1: JP2018-132524A

SUMMARY OF INVENTION

Technical Problem

LIDAR is a sensing technique to measure the distance to an object by irradiating the object with an infrared laser, and detecting the reflected light returned from the object. Thus, the detection sensitivity of LIDAR significantly decreases with an object that does not particularly reflect an infrared laser (e.g., an object with high blackness, such as one with a black color).

However, coating colors with excellent blackness are popular as vehicle coating colors due to the sense of luxury, and are highly demanded. Therefore, there is a demand for coating colors with excellent blackness that can reflect an infrared laser.

Coating is required to impart an excellent appearance to materials, as well as to protect materials; thus, excellent coating film performance, such as high water resistance, is required.

Accordingly, an object of the present invention is to provide a method for forming a multilayer coating film that is capable of forming a multilayer coating film that has excellent blackness, high reflectance of an infrared laser, and excellent coating film performance.

Solution to Problem

A first embodiment of the present invention provides the following method for forming a multilayer coating film, the method comprising step (1): applying a titanium oxide pigment-containing first colored paint (V) to form a first colored coating film, in which the diffuse reflectance at a wavelength of 905 nm or diffuse reflectance at a wavelength of 1550 nm, or both, is 40% or more, step (2): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (3): applying a third colored paint (X) containing a carbon black pigment to the second colored coating film to form a third colored coating film, step (4): applying a clear paint (Y) to the third colored coating film to form a clear coating film, and step (5): heating the first colored coating film formed in step (1), the second colored coating film formed in step (2), the third colored coating film formed in step (3), and the clear coating film formed in step (4) separately or simultaneously to cure these films, wherein the multilayer coating film has a lightness) $L^*(45°)$ of 3 or less, the multilayer coating film has a chroma $C^*(45°)$ of 1 or less, and the diffuse reflectance at a wavelength of 905 nm or the diffuse reflectance at a wavelength of 1550 nm of the multilayer coating film, or both, is 10% or more.

Further, a second embodiment of the present invention provides the following method for totaling a multilayer coating film, the method comprising step (6): applying a titanium oxide pigment-containing first colored paint (V) to form a first colored coating film, in which the diffuse reflectance at a wavelength of 905 nm or diffuse reflectance at a wavelength of 1550 nm, or both, is 40% or more, step (7): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (8): applying a color clear paint (Z) containing a carbon black pigment to the second colored coating film to form a color clear coating film, and step (9): heating the first colored coating film formed in step (6), the second colored coating film formed in step (7), and the color clear coating film formed in step (8) separately or simultaneously to cure these films, wherein the multilayer coating film has a lightness) L*(45°) of 3 or less, the multilayer coating film has a chroma C*(45°) of 1 or less, and the diffuse reflectance at a wavelength of 905 nm or the diffuse reflectance at a wavelength of 1550 nm of the multilayer coating film, or both, is 10% or more.

Advantageous Effects of Invention

The method for forming a multilayer coating film according to the present invention is capable of forming a multilayer coating film that has excellent blackness, high reflectance of an infrared laser, and excellent coating film performance, such as water resistance.

DESCRIPTION OF EMBODIMENTS

The first embodiment of the present invention is described below.

Step (1)

The first embodiment of the present invention first applies a first colored paint (V) to form a first colored coating film in step (1). The first colored paint (V) increases the reflectance of infrared lasers of the formed multilayer coating film, and contains a titanium oxide pigment.

The content of the titanium oxide pigment is preferably 1 to 150 parts by mass, and more preferably 20 to 120 parts by mass, per 100 parts by mass of the resin solids in the first colored paint (V) from the standpoint of, for example, obtaining a multilayer coating film with excellent undercoat hiding power and an increased reflectance of infrared lasers.

In the first colored coating film, the diffuse reflectance at a wavelength of 905 nm or the diffuse reflectance at a wavelength of 1550 nm, or both, is 40% or more.

In the present specification, "diffuse reflectance" refers to a reflectance containing no specular reflection (SCE: Specular Component Excluded) measured with a spectrophotometer equipped with an integrating sphere (Solid Spec 3700, trade name; Shimadzu Corporation), and is a reflectance (relative reflectance) based on the reflectance of a standard white plate defined as 100%. For the standard white plate, a fluorine resin (produced by Labsphere; trade name: Spectralon) is used.

When the diffuse reflectance at a wavelength of 905 nm or the diffuse reflectance at a wavelength of 1550 nm of the first colored coating film, or both, is 40% or more, the formed multilayer coating film can have a high reflectance of an infrared laser.

The diffuse reflectance at a wavelength of 905 nm of the first colored coating film is preferably 45% or more, more preferably 50% or more, and even more preferably 60% or more from the standpoint of obtaining a multilayer coating film with an increased reflectance of infrared lasers. The upper limit of the diffuse reflectance at a wavelength of 905 nm of the first colored coating film is not limited. The upper limit is, for example, 99% or less, 95% or less, 90% or less, 85% or less, or 80% or less.

The diffuse reflectance at a wavelength of 1550 nm of the first colored coating film is preferably 45% or more, more preferably 50% or more, and even more preferably 55% or more from the standpoint of obtaining a multilayer coating film with an increased reflectance of infrared lasers. The upper limit of the diffuse reflectance at a wavelength of 1550 nm of the first colored coating film is not limited. The upper limit is, for example, 99% or less, 95% or less, 90% or less, 85% or less, or 80% or less.

The first colored coating film has a lightness L*(45° of preferably 55 or more, 75 or more, and even more preferably 85 or more in the L*C*h color space from the standpoint of increasing the reflectance of infrared lasers.

The L*C*h color space is a polar coordinates version of the L*a*b* color space, which was standardized in 1976 by the Commission Internationale de l'Eclairage, and also adopted in JIS Z 8781-4(2013). The value of L* represents lightness. The value of C* represents chroma, which is a distance from the starting point. The value of h represents the hue angle that starts at 0° from the axis in the a* red direction, and moves counterclockwise in terms of hue in the L*a*b* color space.

As used herein, "lightness L*(45°)" refers to a lightness L* as measured for light received at an angle of 45 degrees deviated from a specular angle toward a measurement light when the measurement light is illuminated on the surface of the object to be measured at an angle of 45 degrees with respect to the axis perpendicular to the surface of the object to be measured, and is defined as a value of lightness computed from a spectral reflectance using a multi-angle spectrophotometer (trade name: MA-68II; produced by X-Rite).

The first colored paint (V) preferably further contains a resin component and a medium containing water and/or an organic solvent, in addition to the titanium oxide pigment.

The resin component typically contains a base resin and a curing agent, and the resin component for use may be known resins or compounds commonly used in the art. Examples of base resins include acrylic resins, polyester resins, epoxy resins, and polyurethane resins. Examples of curing agents include amino resins, polyisocyanate compounds, and blocked polyisocyanate compounds.

The first colored paint (V) may be an aqueous paint or a solvent-based paint. However, from the standpoint of reducing environmental burden, the first colored paint (V) is preferably an aqueous paint. When the first colored paint (V) is an aqueous paint, the base resin is a resin containing a hydrophilic group, such as a carboxyl group, a hydroxyl group, a methylol group, an amino group, a sulfonic acid group, or a polyoxyethylene group, most preferably a carboxyl group, in an amount sufficient for making the resin soluble in water or dispersed in water. The base resin can be made soluble in water or dispersed in water by neutralizing the hydrophilic group.

The first colored paint (V) may further optionally contain a color pigment other than titanium oxide pigments, an extender pigment, an effect pigment, a UV absorber, a light stabilizer, an antifoaming agent, a thickening agent, and a surface adjusting agent.

Examples of the color pigment other than titanium oxide pigments include carbon black, zinc oxide, molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, and metal oxide complex pigments. In particular, it is preferable to use carbon black from the standpoint of the undercoat hiding power of the formed multilayer coating film, and it is preferable to use a black metal oxide complex pigment from the standpoint of the lightness and the reflectance of infrared lasers of the formed multilayer coating film.

The black metal oxide complex pigment is a black calcined pigment that contains a complex of metal oxides of two or more elements. Specific examples include Ca—Ti—Mn-based, Fe—Cr-based, and Mn—Bi-based oxides.

Examples of commercially available products of the black metal oxide complex pigment include TIPAQUE Black SG-101 (Ca—Ti—Mn-based pigment, Ishihara Sangyo Kaisha, Ltd.), Black 30C940 (Fe—Cr-based pigment, Shepherd), Black 6350 (Fe—Cr-based pigment, Asahi Sangyo Kaisha, Ltd.), Black 6301 (Mn—Bi-based pigment, Asahi Sangyo Kaisha, Ltd.), and Black 9596 (Fe—Cr-based pigment, Dainichiseika Color & Chemicals Mfg. Co., Ltd.).

When the first colored paint (V) contains a color pigment other than titanium oxide pigments, the content thereof is preferably 30 parts by mass or less, and more preferably 0.01 to 20 parts by mass, per 100 parts by mass of the resin solids in the first colored paint (V).

Examples of extender pigments include clay, kaolin, barium sulfate, barium carbonate, calcium carbonate, talc, silica, and alumina white. Of these, barium sulfate and/or talc is preferable for use.

When the first colored paint (V) contains the extender pigment described above, the content of the extender pigment is preferably 30 parts by mass or less, and more preferably 0.01 to 20 parts by mass, per 100 parts by mass of the resin solids in the first colored paint (V).

Examples of effect pigments include aluminum (including vapor-deposition aluminum), copper, zinc, brass, nickel, glass flakes, aluminum oxide, mica, aluminum oxide coated with titanium oxide and/or iron oxide, and mica coated with titanium oxide and/or iron oxide.

When the first colored paint (V) contains the effect pigment described above, the content of the effect pigment is preferably 30 parts by mass or less, and more preferably 0.01 to 20 parts by mass, per 100 parts by mass of the resin solids in the first colored paint (V).

The first colored paint (V) can be applied by a typical method. Examples include methods such as air spray coating, airless spray coating, and rotary-atomization coating. When applying the first colored paint (V), electrostatic charge may optionally be applied. In particular, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the first colored paint (V) be adjusted to have a solids content and a viscosity suitable for coating by appropriately adding water and/or an organic solvent, with optional additives such as a rheology control agent and an antifoaming agent.

The first colored paint (V) has a solids content of 10 to 60 mass %, preferably 15 to 55 mass %, and still more preferably 20 to 50 mass %. It is also preferred that the viscosity of the first colored paint (V) be suitably adjusted with water and/or an organic solvent to a range suitable for coating, which is typically 500 to 5000 mPa·s as measured with a Brookfield viscometer at a rotational speed of 6 rpm at 20° C.

From the standpoint of, for example, obtaining a multilayer coating film with excellent undercoat hiding power and an increased reflectance of infrared lasers, the first colored coating film has a thickness of preferably about 5.0 to 40 µm, more preferably 8.0 to 35 µm, and still more preferably about 10 to 30 µm, on a cured film basis.

Step (2)

The first embodiment of the present invention subsequently applies a second colored paint (W) to the first colored coating film formed in step (1) to form a second colored coating film. The second colored paint (W) contains at least one pigment selected from the group consisting of (A1) a perylene black pigment, (A2) a black metal oxide complex pigment, and the following (A3) pigments.

(A3) Pigments: Two or more pigments selected from the group consisting of blue pigments, red pigments, yellow pigments, and green pigments.

The second colored paint (W) can form a coating film with a relatively high transmittance of infrared lasers and with a low lightness.

The perylene black pigment (A1) is capable of lowering the lightness while suppressing a decrease in the reflectance of infrared lasers of the formed multilayer coating film.

Examples of the perylene black pigment (A1) include C.I. Pigment Black 31 and C.I. Pigment Black 32. As used herein, "C.I." is the abbreviation for Color Index.

When the second colored paint (W) contains the perylene black pigment (A1), the pigment weight concentration of the perylene black pigment (A1) is preferably 3 to 30%, and more preferably 5 to 25% from the standpoint of the lightness and the water resistance of the formed multilayer coating film.

In the present specification, "pigment weight concentration" is defined as the weight concentration of a pigment based on the total solids content of the paint.

The black metal oxide complex pigment (A2) is capable of lowering the lightness while suppressing a decrease in the reflectance of infrared lasers of the formed multilayer coating film.

The black metal oxide complex pigment (A2) may be the black metal oxide complex pigment described above in section "Step (1)."

When the second colored paint (W) contains the black metal oxide complex pigment (A2), the pigment weight concentration of the black metal oxide complex pigment (A2) is preferably 5 to 50%, and more preferably 10 to 35%, from the standpoint of the lightness and the water resistance of the formed multilayer coating film.

The two or more pigments (A3) selected from the group consisting of blue pigments, red pigments, yellow pigments, and green pigments are combinations of pigments that can lower the lightness of the second colored coating film while suppressing a decrease in the reflectance of infrared lasers of the formed second colored coating film by subtractive color mixing, which is known to those skilled in the art.

Examples of the blue pigments include C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 28, C.I. Pigment Blue 60, and C.I. Pigment Blue 75.

Of the blue pigments mentioned above, blue pigments in which the infrared transmittance at a wavelength of 905 nm and the infrared transmittance at a wavelength of 1550 nm are 80% or more are preferable from the standpoint of the reflectance of infrared lasers of the formed multilayer coating film.

Examples of the blue pigments in which the infrared transmittance at a wavelength of 905 nm and the infrared transmittance at a wavelength of 1550 nm are 80% or more include C.I. Pigment Blue 15:1, C.I. Pigment Blue 15:2, C.I. Pigment Blue 15:6, and C.I. Pigment Blue 75.

The infrared transmittance at a wavelength of 905 nm and the infrared transmittance at a wavelength of 1550 nm can be determined in the following manner. A paint composition containing a color pigment is applied to a polypropylene plate. After drying, the coating film is peeled off from the polypropylene, and the transmittance of the coating film is measured with a spectrophotometer equipped with an integrating sphere (Solid Spec 3700, trade name; Shimadzu Corporation).

Specifically, first, 10 parts by mass of a single color pigment is added to a paint comprising a hydroxy-containing acrylic resin and a melamine resin, per 100 parts by mass of the resin solids of the paint, and mixed with stirring. A solvent is added thereto to dilute the mixture to a solids content of about 25%. Next, the obtained paint is applied to a horizontally fixed polypropylene plate using a bar coater such that the coating film has a thickness of 15 μm on a cured coating film basis. After being allowed to stand at room temperature for 10 minutes, the coating film is dried by heating at 100° C. for 60 minute with a hot-air dryer. The resulting coating film is then peeled off from the polypropylene plate, and the transmittance of the coating film is measured with a spectrophotometer equipped with an integrating sphere (Solid Spec 3700, trade name; Shimadzu Corporation).

When the second colored paint (W) contains a blue pigment, the pigment weight concentration of the blue pigment is preferably 0.5 to 12%, and more preferably 1 to 8%.

Examples of the red pigments include C.I. Pigment Red 101, C.I. Pigment Red 122, C.I. Pigment Red 168, C.I. Pigment Red 179, C.I. Pigment Red 202, C.I. Pigment Red 224, C.I. Pigment Red 254, C.I. Pigment Red 255, C.I. Pigment Red 264, C.I. Pigment Orange 36, and C.I. Pigment Violet 19.

Of the red pigments mentioned above as well, red pigments in which the infrared transmittance at a wavelength of 905 nm and the infrared transmittance at a wavelength of 1550 nm are 80% or more are preferable from the standpoint of the reflectance of infrared lasers of the famed multilayer coating film.

Examples of the red pigments in which the infrared transmittance at a wavelength of 905 nm and the infrared transmittance at a wavelength of 1550 nm are 80% or more include C.I. Pigment. Red 178, C.I. Pigment Red 179, C.I. Pigment Red 202, C.I. Pigment Red 264, and C.I. Pigment Violet 19.

When the second colored paint (W) contains a red pigment, the pigment weight concentration of the red pigment is preferably 1 to 20%, and more preferably 2 to 12%.

Examples of the yellow pigments include C.I. Pigment Yellow 42, C.I. Pigment Yellow 110, C.I. Pigment Yellow 129, C.I. Pigment Yellow 138, C.I. Pigment Yellow 139, C.I. Pigment Yellow 150, C.I. Pigment Yellow 151, C.I. Pigment Yellow 154, C.I. Pigment Yellow 184, and C.I. Pigment Yellow 213.

Of the yellow pigments mentioned above as well, yellow pigments in which the infrared transmittance at a wavelength of 905 nm and the infrared transmittance at a wavelength of 1550 nm are 80% or more are preferable from the standpoint of the reflectance of infrared lasers of the formed multilayer coating film.

Examples of the yellow pigments in which the infrared transmittance at a wavelength of 905 nm and the infrared transmittance at a wavelength of 1550 nm are 80% or more include C.I. Pigment Yellow 129, C.I. Pigment Yellow 150, and C.I. Pigment Yellow 213.

When the second colored paint (W) contains a yellow pigment, the pigment weight concentration of the yellow pigment is preferably 0.5 to 12%, and more preferably 1 to 8%.

Examples of the green pigments include C.I. Pigment Green 7, C.I. Pigment Green 26, and C.I. Pigment Green 36.

Of the green pigments mentioned above as well, green pigments in which the infrared transmittance at a wavelength of 905 nm and the infrared transmittance at a wavelength of 1550 nm are 80% or more are preferable from the standpoint of the reflectance of infrared lasers of the formed multilayer coating film.

Examples of the green pigments in which the infrared transmittance at a wavelength of 905 nm and the infrared transmittance at a wavelength of 1550 nm are 80% or more include C.I. Pigment Green 7, and C.I. Pigment Green 36.

When the second colored paint (W) contains a green pigment, the pigment weight concentration of the green pigment is preferably 0.5 to 12%, and more preferably 1 to 8%.

The two or more pigments (A3) selected from the group consisting of blue pigments, red pigments, yellow pigments, and green pigment are preferably three types of pigments, i.e., a blue pigment, a red pigment, and a yellow pigment, from the standpoint of lowering the lightness while suppressing the decrease in the reflectance of infrared lasers of the formed multilayer coating film.

The ratio of the contents of the three types of pigments of blue pigment, red pigment, and yellow pigment (i.e., the content of blue pigment/the content of red pigment/the content of yellow pigment) is preferably 10 to 40/20 to 80/10 to 40 on a mass basis from the standpoint of lowering the lightness while suppressing a decrease in the reflectance of infrared lasers of the formed multilayer coating film.

When the second colored paint (W) contains the two or more pigments (A3) selected from the group consisting of blue pigments, red pigments, yellow pigments, and green pigments, the total pigment weight concentration of the two or more pigments (A3) is preferably 3 to 30%, and more preferably 5 to 25% from the standpoint of the lightness and the water resistance of the formed multilayer coating film.

The second colored paint (W) preferably further contains a resin component and a medium containing water and/or an organic solvent, in addition to the at least one pigment selected from the group consisting of the perylene black pigment (A1), the black metal oxide complex pigment (A2), and the two or more pigments (A3) selected from the group consisting of blue pigments, red pigments, yellow pigments, and green pigments.

The resin component typically contains a base resin and a curing agent, and the resin component for use may be known resins or compounds commonly used in the art. Examples of base resins include acrylic resins, polyester resins, epoxy resins, and polyurethane resins. Examples of curing agents include amino resins, polyisocyanate compounds, and blocked polyisocyanate compounds.

The second colored paint (W) may be an aqueous paint or a solvent-based paint. However, from the standpoint of reducing environmental burden, the second colored paint (W) is preferably an aqueous paint. When the second colored paint (W) is an aqueous paint, the base resin is a resin that contains a hydrophilic group, such as a carboxyl group, a hydroxyl group, a methylol group, an amino group, a sulfonic acid group, or a polyoxyethylene group, most preferably a carboxyl group, in an amount sufficient for making the resin soluble in water or dispersed in water. The base resin can be made soluble in water or dispersed in water by neutralizing the hydrophilic group.

The second colored paint (W) may further optionally contain, for example, an extender pigment, an effect pigment, a UV absorber, a light stabilizer, an antifoaming agent, a thickening agent, a surface adjusting agent, and a color pigment other than the perylene black pigment (A1), the black metal oxide complex pigment (A2), and the two or more pigments (A3) selected from the group consisting of blue pigments, red pigments, yellow pigments, and green pigments.

Examples of the color pigment other than the perylene black pigment (A1), the black metal oxide complex pigment (A2), and the two or more pigments (A3) selected from the group consisting of blue pigments, red pigments, yellow pigments, and green pigments include titanium oxide, carbon black, zinc oxide, and dioxazine pigments.

When the second colored paint (W) contains a color pigment other than the perylene black pigment (A1), the black metal oxide complex pigment (A2), and the two or more pigments (A3) selected from the group consisting of blue pigments, red pigments, yellow pigments, and green pigments, the pigment weight concentration thereof is preferably 30% or less, and more preferably 0.01 to 20%.

Examples of extender pigments include clay, kaolin, barium sulfate, barium carbonate, calcium carbonate, talc, silica, and alumina white. Of these, barium sulfate and/or talc is preferably used.

When the second colored paint (W) contains the extender pigment described above, the pigment weight concentration of the extender pigment is preferably 30% or less, and more preferably 0.01 to 20%.

Examples of effect pigments include aluminum (including vapor-deposition aluminum), copper, zinc, brass, nickel, glass flakes, aluminum oxide, mica, aluminum oxide coated with titanium oxide and/or iron oxide, and mica coated with titanium oxide and/or iron oxide.

When the second colored paint (W) contains the effect pigment described above, the pigment weight concentration of the effect pigment is preferably 30% or less, and more preferably 0.01 to 20%.

The second colored paint (W) can be applied by a typical method. Examples include methods such as air spray coating, airless spray coating, and rotary-atomization coating. When applying the second colored paint (W), electrostatic charge may optionally be applied. In particular, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the second colored paint (W) be adjusted to have a solids content and a viscosity suitable for coating by appropriately adding water and/or an organic solvent, with optional additives such as a rheology control agent and an antifoaming agent.

The second colored paint (W) has a solids content of 10 to 60 mass %, preferably 15 to 55 mass %, and still more preferably 20 to 50 mass %. It is also preferred that the viscosity of the second colored paint (W) be suitably adjusted with water and/or an organic solvent to a range suitable for coating, which is typically 500 to 5000 mPa·s as measured with a Brookfield viscometer at a rotational speed of 6 rpm at 20° C.

The second colored coating film preferably has a thickness of about 5.0 to 40 µm, more preferably about 6.0 to 30 µm, and even more preferably about 7.0 to 20 µm, on a cured film basis, from the standpoint of, for example, lowering the lightness while suppressing a decrease in the reflectance of infrared lasers of the formed multilayer coating film.

Step (3)

The first embodiment of the present invention subsequently applies a third colored paint (X) to the second colored coating film formed in step (2) to form a third colored coating film. The third colored paint (X) improves the blackness of the formed multilayer coating film, and contains a carbon black pigment.

In the present invention, "excellent blackness" means that both the lightness $L^*(45°)$ and the chroma $C^*(45°)$ in the $L^*C^*h$ color space are low.

As used herein, "chroma $C^*(45°)$" refers to a chroma $C^*$ as measured for light received at an angle of 45 degrees deviated from a specular angle toward a measurement light when the measurement light is illuminated on the surface of the object to be measured at an angle of 45 degrees with respect to the axis perpendicular to the surface of the object to be measured, and is defined as a value of chroma computed from a spectral reflectance using a multi-angle spectrophotometer (trade name: MA-68II; produced by X-Rite).

The pigment weight concentration of the carbon black pigment is preferably 0.2 to 5%, more preferably 0.3 to 2.5%, and even more preferably 0.5 to 2% from the standpoint of imparting blackness while suppressing a decrease in the reflectance of infrared lasers of the formed multilayer coating film.

The third colored paint (X) preferably further contains a resin component and a medium containing water and/or an organic solvent, in addition to the carbon black pigment.

The resin component typically contains a base resin and a curing agent, and the resin component for use may be known resins or compounds commonly used in the art. Examples of base resins include acrylic resins, polyester resins, epoxy resins, and polyurethane resins. Examples of curing agents include amino resins, polyisocyanate compounds, and blocked polyisocyanate compounds.

The third colored paint (X) may be an aqueous paint or a solvent-based paint. However, from the standpoint of reducing environmental burden, the third colored paint (X) is preferably an aqueous paint. When the third colored paint (X) is an aqueous paint, the base resin is a resin that contains a hydrophilic group, such as a carboxyl group, a hydroxyl group, a methylol group, an amino group, a sulfonic acid group, or a polyoxyethylene group, most preferably a carboxyl group, in an amount sufficient for making the resin soluble in water or dispersed in water. The base resin can be made soluble in water or dispersed in water by neutralizing the hydrophilic group.

The third colored paint (X) may further optionally contain, for example, an extender pigment, an effect pigment, a UV absorber, a light stabilizer, an antifoaming agent, a thickening agent, a surface adjusting agent, and a color pigment other than the carbon black pigment.

Examples of the color pigment other than the carbon black pigment include titanium oxide, zinc oxide, molybdenum red, Prussian blue, cobalt blue, azo pigments, phthalocyanine pigments, quinacridone pigments, isoindoline pigments, threne pigments, perylene pigments, dioxazine pigments, and diketopyrrolopyrrole pigments. These color pigments can be used singly, or in a combination of two or more.

When the third colored paint (X) contains the color pigment described above other than the carbon black pigment, the content of the color pigment is preferably 30 parts by mass or less, and more preferably 0.01 to 20 parts by mass, per 100 parts by mass of the resin solids in the third colored paint (X).

Examples of extender pigments include clay, kaolin, barium sulfate, barium carbonate, calcium carbonate, talc, silica, and alumina white. Of these, barium sulfate and/or talc is preferable for use.

When the third colored paint (X) contains the extender pigment described above, the content of the extender pigment is preferably 30 parts by mass or less, and more preferably 0.01 to 20 parts by mass, per 100 parts by mass of the resin solids in the third colored paint (X).

Examples of effect pigments include aluminum (including vapor-deposition aluminum), copper, zinc, brass, nickel, glass flakes, aluminum oxide, mica, aluminum oxide coated with titanium oxide and/or iron oxide, and mica coated with titanium oxide and/or iron oxide.

When the third colored paint (X) contains the effect pigment described above, the content of the effect pigment is preferably 30 parts by mass or less, and more preferably 0.01 to 20 parts by mass, per 100 parts by mass of the resin solids in the third colored paint (X).

The third colored paint (X) can be applied by a typical method. Examples include methods such as air spray coating, airless spray coating, and rotary-atomization coating. When applying the third colored paint (X), electrostatic charge may optionally be applied. In particular, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the third colored paint (X) be adjusted to have a solids content and a viscosity suitable for coating by appropriately adding water and/or an organic solvent, with optional additives such as a rheology control agent and an antifoaming agent.

The third colored paint (X) has a solids content of 10 to 60 mass %, preferably 15 to 55 mass %, and still more preferably 20 to 50 mass %. It is also preferred that the viscosity of the third colored paint (X) be suitably adjusted with water and/or an organic solvent to a range suitable for coating, which is typically 500 to 5000 mPa·s as measured with a Brookfield viscometer at a rotational speed of 6 rpm at 20° C.

The third colored coating film preferably has a thickness of about 5.0 to 30 µm, more preferably about 6.0 to 20 µm, and even more preferably about 7.0 to 15 µm, on a cured film basis, from the standpoint of, for example, imparting blackness while suppressing a decrease in the reflectance of infrared lasers of the formed multilayer coating film.

Furthermore, from the standpoint of, for example, imparting blackness while suppressing a decrease in the reflectance of infrared lasers of the formed multilayer coating film, a value obtained by multiplying the thickness (µm) of the third colored coating film on a cured film basis by the pigment weight concentration (%) of the carbon black pigment in the third colored paint (X) is preferably 2.5 to 20, and more preferably 5 to 15.

Step (4)

The first embodiment of the present invention applies a clear paint (Y) to the third colored coating film obtained by applying the third colored paint (X) as described above to form a clear coating film.

The clear paint (Y) for use in the method according to the present invention may be any known clear paint. Specific examples include liquid or powdery clear paints that contain a resin component composed of a base resin and a curing agent as an essential component, and optional components such as additives for paints and a solvent (e.g., water or an organic solvent); and that form a colorless or colored transparent coating film.

Examples of base resins include resins that have cross-linkable functional groups (e.g., hydroxyl, carboxyl, silanol, and epoxy), such as acrylic resin, polyester resin, alkyd resin, fluorine resin, urethane resin, and silicon-containing resin. Examples of curing agents include compounds or resins that have a functional group reactive with the functional groups of the base resin, such as melamine resin, urea resin, polyisocyanate compounds, blocked polyisocyanate compounds, epoxy compounds or resins, carboxy-containing compounds or resins, acid anhydrides, and alkoxy silyl group-containing compounds or resins.

The proportion of the base resin and the curing agent in the resin component is not particularly limited. Typically, the amount of the curing agent for use is 10 to 100 mass %, preferably 20 to 80 mass %, and more preferably 30 to 60 mass % based on the total solids of the base resin.

The clear paint (Y) may optionally contain a solvent such as water and an organic solvent; and additives for paints, such as a curing catalyst, an antifoaming agent, a UV absorber, a rheology control agent, and an anti-settling agent.

The clear paint (Y) can be applied by a method such as electrostatic coating, air spray coating, and airless spray coating. The clear coating film has a thickness of about 10 to 60 µm, more preferably 15 to 50 µm, and still more preferably about 20 to 40 µm on a cured coating film basis.

The clear paint (Y) has a solids content of 10 to 65 mass %, preferably 15 to 55 mass %, and still more preferably 20 to 50 mass %. It is also preferred that the viscosity of the clear paint (Y) be suitably adjusted with water and/or an organic solvent to a range suitable for coating, which is typically about 15 to 60 seconds, and particularly about 20 to 50 seconds as measured with a Ford cup No. 4 viscometer at 20° C.

Step (5)

The first embodiment of the present invention heats the first colored coating film formed in step (1), the second colored coating film formed in step (2), the third colored coating film formed in step (3), and the clear coating film formed in step (4) separately or simultaneously to cure these films.

In particular, from the standpoint of, for example, energy-saving, the first colored coating film, the second colored coating film, the third colored coating film, and the clear coating film are preferably heated simultaneously.

Heating can be performed with a known technique. For example, a drying furnace, such as a hot-blast furnace, an electric furnace, or an infrared-guided heating furnace, may be used. The heating temperature is preferably 70 to 150° C., and more preferably 80 to 140° C. The heating time is not particularly limited; and is preferably 10 to 40 minutes, and more preferably 20 to 30 minutes.

Next, the second embodiment of the present invention is described below.

The second embodiment of the present invention provides a method for forming a multilayer coating film, the method comprising step (6): applying a titanium oxide pigment-containing first colored paint (V) to form a first colored coating film, in which the diffuse reflectance at a wavelength of 905 nm or diffuse reflectance at a wavelength of 1550 nm, or both, is 40% or more, step (7): applying a second colored paint (W) containing at least one pigment selected from the group consisting of (A1)

a perylene black pigment, (A2) a black metal oxide complex pigment, and (A3) two or more pigments selected from the group consisting of blue pigments, red pigments, yellow pigments, and green pigments to the first colored coating film to form a second colored coating film, step (8): applying a color clear paint (Z) containing a carbon black pigment to the second colored coating film to form a color clear coating film, and step (9): heating the first colored coating film formed in step (6), the second colored coating film formed in step (7), and the color clear coating film formed in step (8) separately or simultaneously to cure these films, wherein the multilayer coating film has a lightness) $L^*(45°)$ of 3 or less, the multilayer coating film has a chroma $C^*(45°)$ of 1 or less, and the diffuse reflectance at a wavelength of 905 nm or the diffuse reflectance at a wavelength of 1550 nm of the multilayer coating film, or both, is 10% or more.

Step (6)

Step (6) is as described above in section "Step (1)."

Step (7)

Step (7) is as described above in section "Step (2)."

Step (8)

The second embodiment of the present invention applies a color clear paint (Z) to the second colored coating film formed in step (7) to form a color clear coating film. The color clear paint (Z) improves the blackness of the formed multilayer coating film, and contains a carbon black pigment.

The pigment weight concentration of the carbon black pigment is preferably 0.01 to 2%, more preferably 0.1 to 1%, and even more preferably 0.2 to 0.5% from the standpoint of imparting blackness while suppressing a decrease in the reflectance of infrared lasers of the formed multilayer coating film.

The color clear paint (Z) preferably further contains a resin component composed of a base resin and a curing agent, additives for paints, and a solvent (e.g., water or an organic solvent), in addition to the carbon black pigment.

Examples of base resins include resins that have cross-linkable functional groups (e.g., hydroxyl, carboxyl, silanol, and epoxy), such as acrylic resin, polyester resin, alkyd resin, fluorine resin, urethane resin, and silicon-containing resin. Examples of curing agents include compounds or resins that have a functional group reactive with the functional groups of the base resin, such as melamine resin, urea resin, polyisocyanate compounds, blocked polyisocyanate compounds, epoxy compounds or resins, carboxy-containing compounds or resins, acid anhydrides, and alkoxy silyl group-containing compounds or resins.

The proportion of the base resin and the curing agent in the resin component is not particularly limited. Typically, the amount of the curing agent for use is 10 to 100 mass %, preferably 20 to 80 mass %, and more preferably 30 to 60 mass % based on the total solids of the base resin.

Examples of the additive for paints include curing catalysts, antifoaming agents, UV absorbers, rheology control agents, and anti-settling agents.

The color clear paint (Z) can be applied by a method such as electrostatic coating, air spray coating, and airless spray coating. The clear coating film has a thickness of about 10 to 60 μm, more preferably 15 to 50 μm, and still more preferably about 20 to 40 μm on a cured coating film basis.

Furthermore, from the standpoint of, for example, imparting blackness while suppressing a decrease in the reflectance of infrared lasers of the formed multilayer coating film, a value obtained by multiplying the thickness (μm) of the color clear coating film on a cured film basis by the pigment weight concentration (%) of the carbon black pigment in the color clear paint (Z) is preferably 2.5 to 20, and more preferably 5 to 15.

The color clear paint (Z) has a solids content of 10 to 65 mass %, preferably 15 to 55 mass %, and still more preferably 20 to 50 mass %. It is also preferred that the viscosity of the color clear paint (Z) be suitably adjusted with water and/or an organic solvent to a range suitable for coating, which is typically about 15 to 60 seconds, and particularly about 20 to 50 seconds as measured with a Ford cup No. 4 viscometer at 20° C.

Step (9)

The second embodiment of the present invention heats the first colored coating film formed in step (6), the second colored coating film formed in step (7), and the color clear coating film formed in step (8) separately or simultaneously to cure these films.

In particular, from the standpoint of, for example, energy-saving, the first colored coating film, the second colored coating film, and the color clear coating film are preferably heated simultaneously.

Heating can be performed with a known technique. For example, a drying furnace, such as a hot-blast furnace, an electric furnace, or an infrared-guided heating furnace, may be used. The heating temperature is preferably 70 to 150° C., and more preferably 80 to 140° C. The heating time is not particularly limited; and is preferably 10 to 40 minutes, and more preferably 20 to 30 minutes.

Base Material

The base material to which the method for forming a multilayer coating film according to the present invention is applied can be any base material. Examples include members famed of metal, such as iron, zinc, aluminum, or magnesium; members formed of alloys of these metals; members plated with these metals, or members on which these metals are deposited; and members formed of, for example, glass, plastic, or form of various materials. In particular, steel and plastic materials that constitute vehicle bodies are suitable, with steel being particularly suitable. These members can be optionally subjected to a treatment such as degreasing or surface treatment.

These members on which an undercoating film and/or an intermediate coating film are formed may also be used as a base material. It is generally preferable to use these base materials.

The undercoating film is applied to the surface of a member to hide the surface of the member, or impart anticorrosion properties, rust-resistance, and the like to the member. The undercoating film can be formed by applying an undercoat paint, and curing it. This undercoat paint can be any undercoat paint; and may be a known paint, such as an electrodeposition paint or a solvent-based primer.

The intermediate coating film is applied to a base with an intention to hide a base such as the surface of a member or undercoating film, enhance the adhesion between the base and the top coating film, or impart chipping resistance to the coating film. The intermediate coating can be formed by applying an intermediate paint to the surface of a base such as the surface of a member or undercoating film, and curing the paint. The intermediate paint for use can be any known intermediate paint. For example, an organic solvent-based or aqueous intermediate paint containing a thermosetting resin composition and a color pigment can be preferably used.

When a member having an undercoating film and/or intermediate coating film formed thereon is used as a base material in the method for forming a multilayer coating film according to the present invention, the undercoating film and/or intermediate coating film is cured by heating beforehand, and then the first colored paint (V) of step (1) can be applied. The first colored paint (V) can also be applied with the undercoating film and/or intermediate coating film being uncured.

Formation of Multilayer Coating Film

In accordance with the method for forming a multilayer coating film according to the first embodiment of the present invention, a multilayer coating film is formed by performing step (1): applying a titanium oxide pigment-containing first colored paint (V) to form a first colored coating film, in which the diffuse reflectance at a wavelength of 905 nm or diffuse reflectance at a wavelength of 1550 nm, or both, is 40% or more, step (2): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (3): applying a third colored paint (X) containing a carbon black pigment to the second colored coating film to form a third colored coating film, step (4): applying a clear paint (Y) to the third colored coating film to form a clear coating film, and step (5): heating the first colored coating film formed in step (1), the second colored coating film formed in step (2), the third colored coating film formed in step (3), and the clear coating film formed in step (4) separately or simultaneously to cure these films. The multilayer coating film has a lightness) $L^*(45°)$ of 3 or less. The multilayer coating film has a chroma) $C^*(45°)$ of 1 or less. The diffuse reflectance at a wavelength of 905 nm or the diffuse reflectance at a wavelength of 1550 nm of the multilayer coating film, or both, is 10% or more.

Accordingly, the formed multilayer coating film has excellent blackness, high reflectance of an infrared laser, and excellent coating film performance, such as water resistance.

Further, in accordance with the method for forming a multilayer coating film according to the second embodiment of the present invention, a multilayer coating film is formed by performing step (6): applying a titanium oxide pigment-containing first colored paint (V) to form a first colored coating film, in which the diffuse reflectance at a wavelength of 905 nm or diffuse reflectance at a wavelength of 1550 nm, or both, is 40% or more, step (7): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (8): applying a color clear paint (Z) containing a carbon black pigment to the second colored coating film to form a color clear coating film, and step (9): heating the first colored coating film formed in step (6), the second colored coating film formed in step (7), and the color clear coating film formed in step (8) separately or simultaneously to cure these films. The multilayer coating film has a lightness $L^*(45°)$ of 3 or less. The multilayer coating film has a chroma $C^*(45°)$ of 1 or less. The diffuse reflectance at a wavelength of 905 nm or the diffuse reflectance at a wavelength of 1550 nm of the multilayer coating film, or both, is 10% or more. Accordingly, the formed multilayer coating film has excellent blackness, high reflectance of an infrared laser, and excellent coating film performance, such as water resistance.

Because the formed multilayer coating film has a lightness $L^*(45°)$ of 3 or less and a chroma $C^*(45°)$ of 1 or less, the multilayer coating film can have excellent blackness. In particular, from the standpoint of forming a multilayer coating film with excellent blackness, the multilayer coating film has a lightness $L^*(45°)$ of preferably 2 or less, and more preferably 1.5 or less. In a typical embodiment of the present invention, the phrase "the multilayer coating film has a lightness $L^*(45°)$ of 3 or less" means that the lightness $L^*(45°)$ is 3.0 or less, and the phrase "the multilayer coating film has a lightness $L^*(45°)$ of 2 or less" means that the lightness $L^*(45°)$ is 2.0 or less. In a typical embodiment of the present invention, the phrase "the multilayer coating film has a chroma $C^*(45°)$ of 1 or less" means that the chroma $C^*(45°)$ is 1.0 or less. The lower limit of the lightness $L^*(45°)$ of the multilayer coating film is not limited; and is, for example, 0.1 or more, 0.2 or more, 0.3 or more, or 0.5 or more. Further, from the standpoint of forming a multilayer coating film with excellent blackness, the multilayer coating film has a chroma $C^*(45°)$ of preferably 0.7 or less, and more preferably 0.5 or less. The lower limit of the chroma $C^*(45°)$ of the multilayer coating film is not limited; and is, for example, 0.01 or more, 0.02 or more, 0.03 or more, or 0.05 or more.

Furthermore, because in the formed multilayer coating film, the diffuse reflectance at a wavelength of 905 nm or the diffuse reflectance at a wavelength of 1550 nm, or both, is 10% or more, the multilayer coating film can have an excellent reflectance of an infrared laser.

In particular, the multilayer coating film preferably has a diffuse reflectance at a wavelength of 905 nm of 12% or more, and more preferably 14% or more from the standpoint of forming a multilayer coating film having an excellent reflectance of infrared lasers. The upper limit of the diffuse reflectance at a wavelength of 905 nm of the multilayer coating film is not limited; and is, for example, 90% or less, 80% or less, 70% or less, 60% or less, or 50% or less.

Further, the multilayer coating film preferably has a diffuse reflectance at a wavelength of 1550 nm of 13% or more, and more preferably 16% or more from the standpoint of forming a multilayer coating film having an excellent reflectance of infrared lasers. The upper limit of the diffuse reflectance at a wavelength of 1550 nm of the multilayer coating film is not limited; and is, for example, 90% or less, 80% or less, 70% or less, 60% or less, or 50% or less.

In particular, the method for forming a multilayer coating film according to the first embodiment of the present invention is preferably the following method for forming a multilayer coating film (a) or (b) from the standpoint of forming a multilayer coating film that has excellent blackness, high reflectance of an infrared laser, and excellent coating film performance, such as water resistance.

Method for Forming a Multilayer Coating Film (a):

A method for forming a multilayer coating film, the method comprising step (1a): applying a titanium oxide pigment-containing first colored paint (V) to form a first colored coating film having a diffuse reflectance at a wavelength of 905 nm of 40% or more, step (2a): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (3a): applying a third colored paint (X) containing a carbon black pigment to the second colored coating film to form a third colored coating film, step (4a): applying a clear paint (Y) to the third colored coating film to form a clear coating film, and step (5a): heating the first colored coating film formed in step (1a), the second colored coating film formed in step (2a), the third colored coating film formed in step (3a), and the clear coating film formed in step (4a) separately or simultaneously to cure these films, wherein the multilayer coating film has a lightness) L*(45°) of 3 or less, the multilayer coating film has a chroma C*(45°) of 1 or less, and the multilayer coating film has a diffuse reflectance at a wavelength of 905 nm of 10% or more.

Method for Forming a Multilayer Coating Film (b):

A method for forming a multilayer coating film, the method comprising step (1b): applying a titanium oxide pigment-containing first colored paint (V) to form a first colored coating film having a diffuse reflectance at a wavelength of 1550 nm of 40% or more, step (2b): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (3b): applying a third colored paint (X) containing a carbon black pigment to the second colored coating film to form a third colored coating film, step (4b): applying a clear paint (Y) to the third colored coating film to form a clear coating film, and step (5b): heating the first colored coating film formed in step (1b), the second colored coating film formed in step (2b), the third colored coating film formed in step (3b), and the clear coating film formed in step (4b) separately or simultaneously to cure these films, wherein the multilayer coating film has a lightness) L*(45°) of 3 or less, the multilayer coating film has a chroma C*(45°) of 1 or less, and the multilayer coating film has a diffuse reflectance at a wavelength of 1550 nm of 10% or more.

In particular, the method for forming a multilayer coating film according to the second embodiment of the present invention is preferably the following method for forming a multilayer coating film (c) or (d) from the standpoint of forming a multilayer coating film with excellent blackness, high reflectance of an infrared laser, and excellent coating film performance, such as water resistance.

Method for Forming a Multilayer Coating Film (c):

A method for forming a multilayer coating film, the method comprising step (6c): applying a titanium oxide pigment-containing first colored paint (V) to form a first colored coating film having a diffuse reflectance at a wavelength of 905 nm of 40% or more, step (7c): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (8c): applying a color clear paint (Z) containing a carbon black pigment to the second colored coating film to form a color clear coating film, and step (9c): heating the first colored coating film formed in step (6c), the second colored coating film formed in step (7c), and the color clear coating film formed in step (8c) separately or simultaneously to cure these films, wherein the multilayer coating film has a lightness) L*(45°) of 3 or less, the multilayer coating film has a chroma C*(45°) of 1 or less, and the multilayer coating film has a diffuse reflectance at a wavelength of 905 nm of 10% or more.

Method for Forming a Multilayer Coating Film (d):

A method for forming a multilayer coating film, the method comprising step (6d): applying a titanium oxide pigment-containing first colored paint (V) to form a first colored coating film having a diffuse reflectance at a wavelength of 1550 nm of 40% or more, step (7d): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film, step (8d): applying a color clear paint (Z) containing a carbon black pigment to the second colored coating film to form a color clear coating film, and step (9d): heating the first colored coating film formed in step (6d), the second colored coating film formed in step (7d), and the color clear coating film formed in step (8d) separately or simultaneously to cure these films, wherein the multilayer coating film has a lightness) L*(45°) of 3 or less, the multilayer coating film has a chroma C*(45°) of 1 or less, and the multilayer coating film has a diffuse reflectance at a wavelength of 1550 nm of 10% or more.

Thus, the method for forming a multilayer coating film according to the present invention can be suitably used in forming a multilayer coating film on a variety of industrial products, in particular exterior panels of vehicle bodies.

EXAMPLES

The following describes the present invention in more detail, with reference to Examples and Comparative Examples. However, the present invention is not limited to these Examples. Note that "parts" and "%" are on a mass basis, and the film thickness is on a cured coating film basis.

[1] Preparation of Base Material

A steel plate degreased and treated with zinc phosphate (JIS G 3141, size: 400 mm×300 mm×0.8 mm) was coated with Elecron GT-10 cationic electrodeposition paint (trade name; produced by Kansai Paint Co., Ltd.; a blocked polyisocyanate compound is used as a curing agent in an epoxy-resin polyamine-based cationic resin) by electrodeposition such that the coated film had a film thickness of 20 μm on a cured coating film basis. The coated film was heated at 170° C. for 20 minutes to allow the coated film to be crosslinked and cured, thereby forming an electrodeposition coating film.

[2] Preparation of Paint
Production of Hydroxy-Containing Acrylic Resin Emulsion (a)

Production Example 1

70.7 parts of deionized water and 0.52 parts of Aqualon KH-10 (trade name; produced by DKS Co., Ltd.; emulsifier, active ingredient 97%) were placed into a reaction vessel equipped with a thermometer, a thermostat, a stirrer, a reflux condenser, and a dropping funnel; and mixed and stirred in a nitrogen stream, followed by heating to 80° C. Subsequently, 1% of the entire monomer emulsion described below and 5 parts of a 6% ammonium persulfate aqueous solution were introduced into the reaction vessel, and the mixture was maintained at 80° C. for 15 minutes. Thereafter, the remaining monomer emulsion was added dropwise over a period of 3 hours to the reaction vessel maintained at the same temperature. After completion of the dropwise addition, the mixture was aged for 1 hour. Thereafter, while 40 parts of a 5% 2-(dimethylamino)ethanol aqueous solution was gradually added to the reaction vessel, the reaction product was cooled to 30° C. and discharged while being filtered through a 100-mesh nylon cloth, thereby obtaining a hydroxy-containing acrylic resin emulsion (a) with a solids concentration of 45%. The obtained hydroxy-containing acrylic resin had a hydroxy value of 43 mg KOH/g and an acid value of 12 mg KOH/g.

Monomer Emulsion: 50 parts of deionized water, 10 parts of styrene, 40 parts of methyl methacrylate, 35 parts of ethyl acrylate, 3.5 parts of n-butyl methacrylate, 10 parts of 2-hydroxyethyl methacrylate, 1.5 parts of acrylic acid, 1.0 part of Aqualon KH-10, and 0.03 parts of ammonium persulfate were mixed with stirring, thereby obtaining a monomer emulsion.

Production of Hydroxy-Containing Polyester Resin Solution (b)

Production Example 2

174 parts of trimethylolpropane, 327 parts of neopentyl glycol, 352 parts of adipic acid, 109 parts of isophthalic acid, and 101 parts of 1,2-cyclohexanedicarboxylic anhydride were placed in a reaction vessel equipped with a thermometer, a thermostat, a stirrer, a reflux condenser, and a water separator; and the temperature was increased from 160° to 230° C. over a period of 3 hours. Thereafter, the temperature was maintained at 230° C. while the generated condensed water was distilled off with the water separator to allow the reaction to proceed until the acid value reached 3 mg KOH/g or less. 59 parts of trimellitic anhydride was added to this reaction product, and addition reaction was performed at 170° C. for 30 minutes, followed by cooling to 50° C. or less. 2-(dimethylamino)ethanol in an equivalent amount to acid groups was added thereto to neutralize the reaction product; and then deionized water was gradually added, thereby obtaining a hydroxy-containing polyester resin solution (b) with a solids concentration of 45%. The obtained hydroxy-containing polyester resin had a hydroxy value of 128 mg KOH/g, an acid value of 35 mg KOH/g, and a weight average molecular weight of 13,000.

Production of Pigment Dispersion Pastes (P-1) to (P-5)

Production Example 3

56 parts (solids: 25 parts) of the hydroxy-containing polyester resin solution (b) obtained in Production Example 2, 100 parts of Tipaque UT-771 (trade name, a rutile titanium dioxide pigment, produced by Ishihara Sangyo Kaisha, Ltd.), 0.03 parts of Carbon MA-100 (trade name, a carbon black pigment, produced by Mitsubishi Chemical Corporation), and 5 parts of deionized water were mixed; and the mixture was adjusted to a pH of 8.0 with 2-(dimethylamino) ethanol. Subsequently, the obtained mixture was placed in a wide-mouth glass bottle, and glass beads (diameter: about 1.3 mm) as dispersion media were added thereto. The bottle was hermetically sealed, and dispersing was performed with a paint shaker for 30 minutes, thereby obtaining a pigment dispersion paste (P-1).

Production Examples 4 to 7

The procedure of Production Example 3 was repeated except that the formulations of color pigments shown in Table 1 were applied, thereby obtaining pigment dispersion pastes (P-2) to (P-5). The formulations of the color pigments shown in Table 1 are indicated on a solids mass basis.

TABLE 1

| | | Production Examples | | | | |
|---|---|---|---|---|---|---|
| | | 3 | 4 | 5 | 6 | 7 |
| Pigment dispersion paste | | P-1 | P-2 | P-3 | P-4 | P-5 |
| Color pigment | UT-771 (Note 1) | 100 | 60 | | 60 | 10 | 60 |
| | MA-100 (Note 2) | 0.03 | 0.2 | | | 0.5 |
| | SG-101 (Note 3) | | | 6 | 25 | |

UT-771 (Note 1):
a rutile titanium dioxide pigment, trade name, Tipaque UT-771, produced by Ishihara Sangyo Kaisha, Ltd.
MA-100 (Note 2):
a carbon black pigment, trade name, Carbon MA-100, produced by Mitsubishi Chemical Corporation
SG-101 (Note 3):
a black metal oxide complex pigment, CaO—$TiO_2$—$MnO_2$, trade name, Tipaque Black SG-101, produced by Ishihara Sangyo Kaisha, Ltd.

Production of First Colored Paints (V-1) to (V-5)

Production Example 8

161.03 parts of the pigment dispersion paste (P-1) obtained in Production Example 3, 44.4 parts (solids content: 20 parts) of the hydroxy-containing acrylic resin emulsion (a) obtained in Production Example 1, 71.4 parts (solids content: 25 parts) of UCOAT UX-8100 (trade name, a urethane emulsion, produced by Sanyo Chemical Industries, Ltd., solids content: 35%), and 37.5 parts (solids content: 30 parts) of Cymel 325 (trade name, a melamine resin, produced by Cytec Industries Japan LLC, solids content: 80%) were homogeneously mixed. Subsequently, UH-752 (trade name, produced by ADEKA Corporation, a thickening agent), 2-(dimethylamino)ethanol, and deionized water were added to the obtained mixture, thereby obtaining a first colored paint (V-1) with a pH of 8.0, a paint solids content of 25%, and a viscosity of 3000 mPa·s as measured with a Brookfield viscometer at 20° C. at a rotational speed of 6 rpm.

Production Examples 9 to 12

The procedure of Production Example 8 was repeated except that the formulations shown in Table 2 were applied, thereby obtaining first colored paints (V-2) to (V-5) with a viscosity of 3000 mPa·s as measured with a Brookfield viscometer at 20° C. at a rotational speed of 6 rpm.

Evaluation of the First Colored Coating Film

Using the first colored paints (V-1) to (V-5) obtained above, the diffuse reflectance of the first colored coating film formed from each of the first colored paints at a wavelength of 905 nm and the diffuse reflectance thereof at a wavelength of 1550 nm were measured using a Solid Spec 3700 (trade name, produced by Shimadzu Corporation) as a spectrophotometer and using a fluorine resin (produced by Labsphere, trade name: Spectralon) as a reference white plate for determining the relative reflectance not including specular reflection (SCE: Specular Component Excluded). The lightness L*(45°) of the first colored coating films formed from the obtained first colored paints (V-1) to (V-5) was evaluated with an MA-68II (trade name; produced by X-Rite). The first colored coating films were obtained by applying each of the first colored paints (V-1) to (V-5) to the base material obtained in section [1] above such that the film thickness was 30 μm on a cured coating film basis by using a rotary electrostatic mini bell coater at a booth temperature of 23° C. and a humidity of 68%, allowing the film to stand at room temperature for 3 minutes, and then heating the film at 140° C. for 30 minutes in a hot-air circulating oven. Table 2 also illustrates the evaluation results.

TABLE 2

|  |  | Production Examples | | | | |
| --- | --- | --- | --- | --- | --- | --- |
|  |  | 8 | 9 | 10 | 11 | 12 |
| First colored paint |  | V-1 | V-2 | V-3 | V-4 | V-5 |
| Pigment dispersion paste | Name | P-1 | P-2 | P-3 | P-4 | P-5 |
|  | Amount | 161.03 | 121.2 | 127 | 96 | 121.5 |
| First colored coating film | Diffuse reflectance (%) at a wavelength of 905 nm | 70 | 45 | 45 | 35 | 35 |
|  | Diffuse reflectance (%) at a wavelength of 1550 nm | 45 | 40 | 50 | 55 | 25 |
|  | Lightness L*(45°) | 90 | 75 | 60 | 25 | 70 |

Production of Hydroxy-Containing Acrylic Resin Emulsion (c)

Production Example 13

130 parts of deionized water and 0.52 parts of Aqualon KH-10 were placed in a reaction vessel equipped with a thermometer, a thermostat, a stirrer, a reflux condenser, and a dropping funnel; and stirred and mixed in a nitrogen airstream, followed by heating to 80° C. Subsequently, 1% of the entire amount of the following monomer emulsion (1) and 5.3 parts of a 6% ammonium persulfate aqueous solution were placed in the reaction vessel, and maintained at 80° C. for 15 minutes. Thereafter, the remaining monomer emulsion (1) was added dropwise into the reaction vessel maintained at the same temperature over a period of 3 hours. After completion of the dropwise addition, the mixture was aged for 1 hour. Subsequently, the following monomer emulsion (2) was added dropwise over a period of 1 hour, followed by aging for 1 hour. Thereafter, while 40 parts of a 5% dimethylethanol amine aqueous solution was gradually added to the reaction vessel, the reaction product was cooled to 30° C. and discharged while being filtered through a 100-mesh nylon cloth, thereby obtaining a hydroxy-containing acrylic resin emulsion (c) having a solids concentration of 30%. The obtained hydroxy-containing acrylic resin had a hydroxy value of 25 mg KOH/g and an acid value of 33 ma KOH/g.

Monomer emulsion (1): 42 parts of deionized water, 0.72 parts of Aqualon KH-10, 2.1 parts of methylenebisacrylamide, 2.8 parts of styrene, 16.1 parts of methyl methacrylate, 28 parts of ethyl acrylate, and 21 parts of n-butyl acrylate were mixed with stirring, thereby obtaining monomer emulsion (1).

Monomer emulsion (2): 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed with stirring, thereby obtaining monomer emulsion (2).

Production of Hydroxy-Containing Polyester Resin Solution (d)

Production Example 14

109 parts of trimethylol propane, 141 parts of 1,6-hexanediol, 126 parts of hexahydrophthalic anhydride, and 120 parts of adipic acid were placed in a reaction vessel equipped with a thermometer, a thermostat, a stirrer, a reflux condenser, and a water separator; and heated to increase the temperature from 160° C. to 230° C. over a period of 3 hours, followed by a condensation reaction at 230° C. for 4 hours. Subsequently, in order to add carboxyl groups to the obtained condensation reaction product, 38.3 parts of trimellitic anhydride was further added, and the mixture was allowed to react at 170° C. for 30 minutes. The reaction product was then diluted with 2-ethyl-1-hexanol, thereby obtaining a hydroxy-containing polyester resin solution (d) with a solids concentration of 70%. The obtained hydroxy-containing polyester resin had a hydroxy value of 150 mg KOH/g, an acid value of 46 mg KOH/g, and a weight average molecular weight of 6,400.

Production of Pigment Dispersion Pastes (P-6) to (P-23)

Production Example 15

35.7 parts (solids content: 25 parts) of the hydroxy-containing polyester resin solution (d) obtained in Production Example 14, 18 parts of Paliogen Black L0086 (trade name, a perylene black pigment, C.I. Pigment Black 32, produced by BASF), and 5 parts of deionized water were mixed and adjusted to a pH of 8.0 with 2-(dimethylamino)ethanol. Subsequently, the obtained mixture was placed in a wide-mouth glass bottle, and glass beads (diameter: about 1.3 mm) were added as dispersion media. The bottle was hermetically sealed, and the mixture was dispersed with a paint shaker for 30 minutes, thereby obtaining a pigment dispersion paste (P-6).

Production Examples 16 to 32

The procedure of Production Example 15 was repeated except that the formulations of color pigments shown in Table 3 were applied, thereby obtaining pigment dispersion pastes (P-7) to (P-23). The formulations of the color pigments shown in Table 3 are indicated by components on a solids mass basis.

TABLE 3

| | | Production Example | | | | | | | | |
|---|---|---|---|---|---|---|---|---|---|---|
| | | 15 | 16 | 17 | 18 | 19 | 20 | 21 | 22 | 23 |
| Pigment dispersion paste | | P-6 | P-7 | P-8 | P-9 | P-10 | P-11 | P-12 | P-13 | P-14 |
| Color pigment | L0086 (Note 4) | 18 | 25.2 | 9 | | | | | | |
| | SG-101 (Note 3) | | | | 40 | 20 | | | | |
| | 5206M (Note 5) | | | | | | 4.5 | 6.3 | 6.5 | 4.5 |
| | R6438 (Note 6) | | | | | | 9 | 12.6 | 11 | 9 |
| | Y5688 (Note 7) | | | | | | 4.5 | 6.3 | | |
| | L8730 (Note 8) | | | | | | | | | 4.5 |
| | R5000 (Note 9) | | | | | | | | | |

| | | Production Examples | | | | | | | | |
|---|---|---|---|---|---|---|---|---|---|---|
| | | 24 | 25 | 26 | 27 | 28 | 29 | 30 | 31 | 32 |
| Pigment dispersion paste | | P-15 | P-16 | P-17 | P-18 | P-19 | P-20 | P-21 | P-22 | P-23 |
| Color pigment | L0086 (Note 4) | | | | | | | | | |
| | SG-101 (Note 3) | | | | | | | | | |
| | 5206M (Note 5) | 2.25 | 9 | 1 | | | | | | |
| | R6438 (Note 6) | 4.5 | 18 | 2 | | | | | | |
| | Y5688 (Note 7) | 2.25 | 9 | 1 | | | | | | |
| | L8730 (Note 8) | | | | | | | | | |
| | R5000 (Note 9) | | | | 2 | 0.5 | 1 | 1.5 | 0.25 | 3 |

L0086 (Note 4):
a perylene black pigment, C.I. Pigment Black 32, trade name, Paliogen Black L0086, produced by BASF, Ltd.
5206M (Note 5):
a blue pigment, C.I. Pigment Blue 15:1, trade name, Cyanine Blue 5206M, produced by Dainichiseika Color & Chemicals Mfg. Co., Ltd.
R6438 (Note 6):
a red pigment, C.I. Pigment Red 179, trade name, Maroon 179 (229-6438), produced by Sun Chemical Corporation
Y5688 (Note 7):
a yellow pigment, C.I. Pigment Yellow 150, trade name, Bayfast Yellow Y-5688, produced by Lanxess
L8730 (Note 8):
a green pigment, C.I. Pigment Green 7, trade name, Heliogen Green L8730, produced by BASF
R5000 (Note 9):
a carbon black pigment, trade name, Raven 5000 Ultra III Beads, produced by Columbian Carbon Co., Ltd.

Evaluation of Blue Pigment, Red Pigment, Yellow Pigment, and Green Pigment

The infrared transmittance of the above-used blue pigment, red pigment, yellow pigment, and green pigment at a wavelength of 905 nm and the infrared transmittance of the pigments at a wavelength of 1550 nm were evaluated by the following method.

Infrared Transmittance at a Wavelength of 905 nm and Infrared Transmittance at a Wavelength of 1550 nm 10 parts of a pigment to be measured was incorporated per 100 parts of resin solids of a paint consisting of 70 parts of the hydroxy-containing acrylic resin solution described below and 30 parts of Cymel 350 (trade name, a melamine resin, produced by Allnex Japan Inc.), and mixed with stirring. Deionized water was added to dilute the mixture to a solids content of about 25%. Subsequently, the obtained paint was applied to a horizontally fixed polypropylene plate with a bar coater such that the obtained coating film had a thickness of 15 μm on a cured coating film basis, and allowed to stand at room temperature for 10 minutes. The coating film was then dried by heating at 100° C. for 60 minutes using a hot-air dryer. Subsequently, the obtained coating film was peeled off from the polypropylene plate, and the transmittance of each coating film was measured using a spectrophotometer equipped with an integrating sphere (produced by Shimadzu Corporation, trade name: Solid Spec 3700). Table 4 shows the evaluation results.

Hydroxy-containing acrylic resin solution: 35 parts of propylene glycol monopropyl ether was placed into a reaction vessel equipped with a thermometer, a thermostat, a stirrer, a reflux condenser, a nitrogen introduction tube, and a dropping funnel, and heated to 85° C. A mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was then added dropwise over a period of 4 hours. After the dropwise addition, the mixture was aged for 1 hour. Then, a mixture of 10 parts of propylene glycol monopropyl ether and 1 part of 2,2'-azobis(2,4-dimethylvaleronitrile) was further added dropwise over a period of 1 hour. After the dropwise addition, the mixture was aged for 1 hour. Further, 7.4 parts of diethanolamine was added to obtain a hydroxy-containing acrylic resin solution having a solids content of 55%. The obtained hydroxy-containing acrylic resin solution had an acid value of 47 mg KOH/g, a hydroxy value of 72 mg KOH/g, and a weight average molecular weight of 58,000.

TABLE 4

| | | Infrared transmittance (%) at a wavelength of 905 nm | Infrared transmittance (%) at a wavelength of 1550 nm |
|---|---|---|---|
| Color pigment | 5206M (Note 6) | 92 | 99 |
| | R6438 (Note 7) | 95 | 98 |
| | Y5688 (Note 8) | 95 | 99 |
| | L8730 (Note 9) | 85 | 98 |

Production of Second Colored Paints (W-1) to (W-13)

Production Example 33

58.7 parts of the pigment dispersion paste (P-6) obtained in Production Example 15, 83.3 parts (solids content: 25 parts) of the hydroxy-containing acrylic resin emulsion (c) obtained in Production Example 13, 57.1 parts (solids content: 20 parts) of UCOAT UX-8100 (trade name, a urethane emulsion, produced by Sanyo Chemical Industries, Ltd., solids content: 35%), and 37.5 parts (solids content: 30 parts) of Cymel 325 (trade name: a melamine resin, produced by Alinex Netherlands B.V., solids content: 80%) were homogeneously mixed. Subsequently, UH-752 (trade name, produced by Adeka Corporation, a thickening agent), 2-(dimethylamino)ethanol, and deionized water were added to the obtained mixture, thereby obtaining a second colored paint (W-1) with a pH of 8.0, a paint solids content of 25%, and a viscosity of 3000 mPa·s as measured at 20° C. and at a rotational speed of 6 rpm with a Brookfield viscometer.

Production Examples 34 to 45

Production Example 33 was repeated except that the formulations shown in Table 5 were applied, thereby obtaining second colored paints (W-2) to (W-13) with a viscosity of 3000 mPa·s as measured at 20° C. and at a rotational speed of 6 ppm with a Brookfield viscometer. The values in parentheses of the resin components indicate a solids content.

TABLE 5

| | | | \multicolumn{7}{c|}{Production Examples} |
|---|---|---|---|---|---|---|---|---|---|
| | | | 33 | 34 | 35 | 36 | 37 | 38 | 39 |
| Second colored paint | | | W-1 | W-2 | W-3 | W-4 | W-5 | W-6 | W-7 |
| Pigment dispersion paste | | Name | P-6 | P-7 | P-8 | P-9 | P-10 | P-11 | P-12 |
| | | Amount | 58.7 | 65.9 | 49.7 | 80.7 | 60.7 | 58.7 | 65.9 |
| Solids content in pigment dispersion paste | Hydroxy-containing polyester resin solution (d) | | 35.7(25) | 35.7(25) | 35.7(25) | 35.7(25) | 35.7(25) | 35.7(25) | 35.7(25) |
| | Perylene black pigment (A1) | L0086 (Note 4) | 18 | 25.2 | 9 | | | | |
| | Black, metal oxide complex pigment (A2) | SG-101 (Note 3) | | | | 40 | 20 | | |
| | Two or more pigments (A3) selected from the group consisting of blue pigments, red pigments, yellow pigments, and green pigments | 5206M (Note 5) | | | | | | 4.5 | 6.3 |
| | | P6438 (Note 6) | | | | | | 9 | 12.6 |
| | | Y5688 (Note 7) | | | | | | 4.5 | 6.3 |
| | | L8730 (Note 8) | | | | | | | |
| | Carbon black pigment | R5000 (Note 9) | | | | | | | |
| Resin component | Hydroxy-containing acrylic resin emulsion (c) | | 83.3(25) | 83.3(25) | 83.3(25) | 83.3(25) | 83.3(25) | 83.3(25) | 83.3(25) |
| | UCOAT UK-8100 | | 57.1(20) | 57.1(20) | 57.1(20) | 57.1(20) | 57.1(20) | 57.1(20) | 57.1(20) |
| | Cymel 325 | | 37.5(30) | 37.5(30) | 37.5(30) | 37.5(30) | 37.5(30) | 37.5(30) | 37.5(30) |
| Pigment weight concentration (%) of each pigment in the second colored paint (W) | Perylene black pigment (A1) | | 15.25 | 20.12 | 8.26 | | | | |
| | Black metal oxide complex pigment (A2) | | | | | 23.57 | 16.67 | | |
| | Two or more pigment (A3) selected from the group consisting of blue pigments, red pigments, yellow pigments, and green pigments | Blue pigment | | | | | | 3.81 | 5.03 |
| | | Red pigment | | | | | | 7.63 | 10.06 |
| | | Yellow pigment | | | | | | 3.81 | 5.03 |
| | | Green pigment | | | | | | | |
| | | Total of pigments (A3) | | | | | | 15.25 | 20.12 |

| | | | \multicolumn{6}{c|}{Production Examples} |
|---|---|---|---|---|---|---|---|---|
| | | | 40 | 41 | 42 | 43 | 44 | 45 |
| Second colored paint | | | W-S | W-9 | W-10 | W-11 | W-12 | W-13 |
| Pigment dispersion paste | | Name | P-13 | P-14 | P-15 | P-16 | P-17 | P-18 |
| | | Amount | 58.2 | 58.7 | 49.7 | 76.7 | 44.7 | 42.7 |
| Solids content in pigment dispersion paste | Hydroxy-containing polyester resin solution (d) | | 35.7(25) | 35.7(25) | 35.7(25) | 35.7(25) | 35.7(25) | 35.7(25) |
| | Perylene black pigment (A1) | L0086 (Note 4) | | | | | | |
| | Slack metal oxide complex pigment (A2) | SG-101 (Note 3) | | | | | | |
| | Two or more pigments (A3) selected from the group consisting of blue pigments, red pigments, yellow pigments, and green pigments | 5206M (Note 5) | 6.5 | 4.5 | 2.25 | 9 | 1 | |
| | | R6438 (Note 6) | 11 | 9 | 4.5 | 18 | 2 | |
| | | Y5688 (Note 7) | | | 2.25 | 9 | 1 | |
| | | L8730 (Note 8) | | 4.5 | | | | |
| | Carbon black pigment | R5000 (Note 9) | | | | | | 2 |

TABLE 5-continued

| Resin component | Hydroxy-containing acrylic resin emulsion (c) | | 83.3(25) | 83.3(25) | 83.3(25) | 83.3(25) | 83.3(25) | 83.3(25) |
|---|---|---|---|---|---|---|---|---|
| | UCOAT UX-8100 | | 57.1(20) | 57.1(20) | 57.1(20) | 57.1(20) | 57.1(20) | 57.1(20) |
| | Cymel 325 | | 37.5(30) | 37.5(30) | 37.5(30) | 37.5(30) | 37.5(30) | 37.5(30) |
| Pigment weight concentration (%) of each pigment in the second colored paint (W) | Parylene black pigment (A1) | | | | | | | |
| | Black metal oxide complex pigment (A2) | | | | | | | |
| | Two or more pigments (A3) selected from the group consisting of blue pigments, red pigments, yellow pigments, and green pigments | Blue pigment | 5.53 | 3.81 | 2.06 | 6.62 | 0.96 | |
| | | Red pigment | 9.36 | 7.63 | 4.13 | 13.24 | 1.92 | |
| | | Yellow pigment | | | 2.06 | 6.62 | 0.96 | |
| | | Green pigment | | 3.81 | | | | |
| | | Total of pigments (A3) | 14.89 | 15.25 | 8.25 | 26.48 | 3.84 | 0 |

Production of Third Colored Paints (X-1) to (X-9)

Production Example 46

41.2 parts of the pigment dispersion paste (P-19) obtained in Production Example 28, 83.3 parts (solids content: 25 parts) of the hydroxy-containing acrylic resin emulsion (c) obtained in Production Example 13, 57.1 parts (solids content: 20 parts) of UCOAT UX-8100 (trade name, a urethane emulsion, produced by Sanyo Chemical Industries, Ltd., solids content: 35%), and 37.5 parts (solids content: 30 parts) of Cymel 325 (trade name: a melamine resin, produced by Allnex Netherlands B.V., solids content: 80%) were homogeneously mixed. Subsequently, UH-752 (trade name, produced by Adeka Corporation, a thickening agent), 2-(dimethylamino)ethanol, and deionized water were added to the obtained mixture, thereby obtaining a third colored paint (X-1) with a pH of 8.0, a paint solids content of 25%, and a viscosity of 3000 mPa·s as measured at 20° C. and at a rotational speed of 6 rpm with a Brookfield viscometer.

Production Examples 47 to 54

Production Example 46 was repeated except that the formulations shown in Table 6 were applied, thereby obtaining third colored paints (X-2) to (X-9) with a viscosity of 3000 mPa·s as measured at 20° C. and at a rotational speed of 6 rpm with a Brookfield viscometer. The values in parentheses of the resin components indicate a solids content.

TABLE 6

| | | | Production Examples | | | | |
|---|---|---|---|---|---|---|---|
| | | | 46 | 47 | 48 | 49 | 50 |
| Third colored paint | | | X-1 | X-2 | X-3 | X-4 | X-5 |
| Pigment dispersion paste | | Name | P-19 | P-20 | P-21 | P-18 | P-22 |
| | | Amount | 41.2 | 41.7 | 42.2 | 42.7 | 40.95 |
| Solids content in pigment dispersion paste | Hydroxy-containing polyester resins solution (d) | | 35.7(25) | 35.7(25) | 35.7(25) | 35.7(25) | 35.7(25) |
| | Carbon black pigment | R5000 (Note 5) | 0.5 | 1 | 1.5 | 2 | 0.25 |
| | Two or more pigments (A3) selected from the group consisting of blue pigments, red pigments, yellow pigments, and green pigments | 5206M (Note 5) | | | | | |
| | | R6438 (Note 6) | | | | | |
| | | Y5688 (Note 7) | | | | | |
| Resin components | Hydroxy group-containing acrylic resin emulsion (c) | | 83.3(25) | 83.3(25) | 83.3(25) | 83.3(25) | 83.3(25) |
| | Hydroxy-containing polyester resin solution (d) | | | | | | |
| | UCOAT UX-8100 | | 57.1(20) | 57.1(20) | 57.1(20) | 57.1(20) | 57.1(20) |
| | Cymel 325 | | 37.5(30) | 37.5(30) | 37.5(30) | 37.5(30) | 37.5(30) |
| Pigment weight concentration (%) of carbon black pigment in the third colored paint (X) | | | 0.5 | 0.99 | 1.48 | 1.96 | 0.25 |

TABLE 6-continued

| | | | Production Examples | | | |
|---|---|---|---|---|---|---|
| | | | 51 | 52 | 53 | 54 |
| Third colored paint | | | X-6 | X-7 | X-8 | X-9 |
| Pigment dispersion paste | | Name | P-23 | P-11 | P-16 | |
| | | Amount | 43.7 | 58.7 | 76.7 | |
| Solids content in pigment dispersion paste | Hydroxy-containing polyester resin solution (d) | | 35.7(25) | 35.7(25) | 35.7(25) | |
| | Carbon black pigment | R5000 (Note 9) | 3 | | | |
| | Two or more pigments (A3) selected from the group consisting of blue pigments, red pigments, yellow pigments, and green pigments | 5206M (Note 5) | | 4.5 | 9 | |
| | | R6438 (Note 6) | | 9 | 18 | |
| | | Y5688 (Note 7) | | 4.5 | 9 | |
| Resin components | Hydroxy group-containing acrylic resin emulsion (c) | | 83.3(25) | 83.3(25) | 83.3(25) | 83.3(25) |
| | Hydroxy-containing polyester resin solution (d) | | | | | 35.7(25) |
| | UCOAT UX-8100 | | 57.1(20) | 57.1(20) | 57.1(20) | 57.1(20) |
| | Cymel 325 | | 37.5(30) | 37.5(30) | 37.5(30) | 37.5(30) |
| Pigment weight concentration (%) of carbon black pigment in the third colored paint (X) | | | 2.91 | 0 | 0 | 0 |

Preparation of Color Clear Paint (Z)

Production Example 55

0.4 parts of Raven 5000 Ultra III Beads (trade name, a carbon black pigment, produced by Columbian Carbon Co., Ltd.) was added to 100 parts of Magicron KINO-1210 (trade name, produced by Kansai Paint Co., Ltd., an acrylic resin-based, acid-/epoxy-curable, solvent-type topcoat clear paint), and mixed with stirring to prepare a color clear paint (Z-1). The pigment weight concentration of the carbon black pigment in the color clear paint (Z-1) was 0.4%.

Production Example 56

0.2 parts of Raven 5000 Ultra III Beads (trade name, a carbon black pigment, produced by Columbian Carbon Co., Ltd.) was added to 100 parts of Magicron KINO-1210 (trade name, produced by Kansai Paint Co., Ltd., an acrylic resin-based, acid-/epoxy-curable, solvent-type topcoat clear paint), and mixed with stirring to prepare a color clear paint (Z-2). The pigment weight concentration of the carbon black pigment in the color clear paint (Z-2) was 0.2%.

[3] Preparation of Test Plate

Preparation of Test Plate 1 (First Embodiment)

Example 1

Coating with First Colored Paint (V)

The first colored paint (V-1) prepared above in section [2] was applied to the base material prepared above in section [1] with a rotary electrostatic mini bell coater at a booth temperature of 23° C. and at a humidity of 68% such that the coating film had a thickness of 30 μm on a cured coating film basis. The coated film was then allowed to stand at room temperature for 3 minutes, thereby obtaining an uncured first colored coating film.

Coating with Second Colored Paint (W)

The second colored paint (W-1) prepared above in section [2] was applied to the uncured first colored coating film with a rotary electrostatic mini bell coater at a booth temperature of 23° C. and at a humidity of 68% such that the coating film had a thickness of 7.5 μm on a cured coating film basis. The coated film was allowed to stand at room temperature for 3 minutes, thereby obtaining an uncured second colored coating film.

Coating with Third Colored Paint (X)

The third colored paint (X-2) prepared above in section [2] was applied to the uncured second colored coating film with a rotary electrostatic mini bell coater at a booth temperature of 23° C. and at a humidity of 68% such that the coating film had a thickness of 7.5 μm on a cured coating film basis. The coated film was allowed to stand at room temperature for 3 minutes, and then preheated at 80° C. for 3 minutes, thereby obtaining an uncured third colored coating film.

Coating with Clear Paint (Y)

A clear paint (Y) (Magicron KINO-1210, trade name, produced by Kansai Paint Co., Ltd., an acrylic resin-based, acid-/epoxy-curable, solvent-type topcoat clear paint) was applied to the uncured third colored coating film with a rotary electrostatic mini bell coater at a booth temperature of 23° C. and at a humidity of 68% such that the coating film had a film thickness of 35 μm on a cured coating film basis. The coating film was then allowed to stand at room temperature for 7 minutes; and then heated in a hot-air circulating oven at 140° C. for 30 minutes to cure a multilayer coating film composed of the first colored coating film, the second colored coating film, and the clear coating film by drying simultaneously, thereby preparing a test plate.

Examples 2 to 18 and Comparative Examples 1 to 8

Test plates were obtained in the same manner as in Example 1, except that the paints and film thicknesses shown in Table 7 were used.

Preparation of Test Plate 2 (Second Embodiment)

Example 19

Coating with First Colored Paint (V)

The first colored paint (V-1) prepared above in section [2] was applied to the base material prepared above in section

[1] with a rotary electrostatic mini bell coater at a booth temperature of 23° C. and at a humidity of 68% such that the coating film had a thickness of 30 μm on a cured coating film basis. The coated film was then allowed to stand at room temperature for 3 minutes, thereby obtaining an uncured first colored coating film.

Coating with Second Colored Paint (W)

The second colored paint (W-3) prepared above in section [2] was applied to the uncured first colored coating film with a rotary electrostatic mini bell coater at a booth temperature of 23° C. and at a humidity of 68% such that the coating film had a thickness of 7.5 μm on a cured coating film basis. The coated film was allowed to stand at room temperature for 3 minutes, and then preheated at 80° C. for 3 minutes, thereby obtaining an uncured second colored coating film.

Coating with Color Clear Paint (Z)

The color clear paint (Z-1) was applied to the uncured second colored coating film with a rotary electrostatic mini bell coater at a booth temperature of 23° C. and at a humidity of 68% such that the coating film had a film thickness of 35 μm on a cured coating film basis. The coating film was then allowed to stand at room temperature for 7 minutes; and then heated in a hot-air circulating oven at 140° C. for 30 minutes to cure a multilayer coating film composed of the first colored coating film, the second colored coating film, and the color clear coating film by drying simultaneously, thereby preparing a test plate.

Examples 20 and 21

Test plates were obtained in the same manner as in Example 19, except that the paints and film thicknesses shown in Table 8 were used.

Evaluation of Coating Film

The coating films on the test plates obtained in the above manner were evaluated by the following methods. Tables 7 and 8 show the results.

Lightness L*(45°)

The lightness L*(45°) of each test plate was measured with an MA-68II (trade name, produced by X-Rite Inc.).

Chroma C*(45°)

The chroma C*(45°) of each test plate was measured with an MA-68II (trade name, produced by X-Rite Inc.).

Diffuse reflectance at a wavelength of 905 nm and diffuse reflectance at a wavelength of 1550 nm (measurement of infrared laser reflectance)

For each test plate, the reflectance not including specular reflection (SCE: Specular Component Excluded) was measured using a Solid Spec 3700 (trade name, produced by Shimadzu Corporation).

Anti-water adhesion: Each test plate was immersed in warm water at 40° C. for 240 hours. Immediately after the test plate was removed from the warm water and dried, cross-cuts were made in the coating film of the test plate to form a grid of 100 squares (2 mm×2 mm) in accordance with JIS K 5600-5-6 (1990). Subsequently, adhesive cellophane tape was applied to the surface of the grid portion, and the tape was rapidly peeled off. Each test plate was evaluated based on the remaining number of squares of the coating film. A and B are regarded as passing.

A: 100 squares of the coating film remained, without any edge-chipping.

B: 100 squares of the coating film remained; however, edge-chipping was present.

C: The number of squares of the coating film remaining was 90 or more, but 99 or less, out of the 100 squares.

D: The number of squares of the coating film remaining was 89 or less out of the 100 squares.

TABLE 7

|  | Examples | | | | | | | | |
| --- | --- | --- | --- | --- | --- | --- | --- | --- | --- |
|  | 1 | 2 | 3 | 4 | 5 | 6 | 7 | 8 | 9 |
| First colored paint | V-1 | V-1 | V-1 | V-1 | V-1 | V-1 | V-1 | V-1 | V-1 |
| Second colored paint | W-1 | W-1 | W-2 | W-1 | W-4 | W-6 | W-6 | W-6 | W-6 |
| Thickness (μm) of the second colored coating film on a cured film basis | 7.5 | 7.5 | 7.5 | 5 | 7.5 | 7.5 | 7.5 | 7.5 | 7.5 |
| Third colored paint | X-2 | X-3 | X-3 | X-3 | X-2 | X-1 | X-2 | X-2 | X-2 |
| Thickness (μm) of the third colored coating film on a cured film basis | 7.5 | 7.5 | 7.5 | 7.5 | 7.5 | 7.5 | 5 | 7.5 | 12 |
| Pigment weight concentration (%) of the carbon black pigment in the third colored paint (X) | 0.99 | 1.48 | 1.48 | 1.48 | 0.99 | 0.50 | 0.99 | 0.99 | 0.99 |
| Value obtained by multiplying the thickness (μm) of the third colored coating film on a cured film basis by the pigment weight concentration (%) of the carbon black pigment in the third colored paint (X) | 7.4 | 11.1 | 11.1 | 11.1 | 7.4 | 3.7 | 5.0 | 7.4 | 11.9 |
| Lightness L*(45°) | 1.7 | 1.2 | 1.1 | 1.4 | 1.9 | 2.6 | 2.0 | 1.6 | 1.0 |
| Chroma C*(45°) | 0.4 | 0.2 | 0.2 | 0.3 | 0.7 | 0.8 | 0.6 | 0.5 | 0.2 |
| Diffuse reflectance (%) at a wavelength of 905 nm | 25 | 15 | 14 | 17 | 15 | 41 | 35 | 28 | 13 |
| Diffuse reflectance (%) at a wavelength of 1550 nm | 25 | 18 | 17 | 20 | 18 | 30 | 27 | 25 | 16 |
| Anti-water adhesion | A | A | B | A | B | A | A | A | A |

|  | Examples | | | | | | | | |
| --- | --- | --- | --- | --- | --- | --- | --- | --- | --- |
|  | 10 | 11 | 12 | 13 | 14 | 15 | 16 | 17 | 18 |
| First colored paint | V-1 | V-1 | V-1 | V-1 | V-1 | V-1 | V-2 | V-3 | V-4 |
| Second colored paint | W-6 | W-7 | W-6 | W-6 | W-8 | W-9 | W-6 | W-6 | W-6 |

TABLE 7-continued

| | | | | | | | | | |
|---|---|---|---|---|---|---|---|---|---|
| Thickness (μm) of the second colored coating film on a cured film basis | 7.5 | 7.5 | 5 | 7.5 | 7.5 | 7.5 | 7.5 | 7.5 | 7.5 |
| Third colored paint | X-3 | X-3 | X-3 | X-4 | X-3 | X-3 | X-2 | X-2 | X-2 |
| Thickness (μm) of the third colored coating film on a cured film basis | 7.5 | 7.5 | 7.5 | 7.5 | 7.5 | 7.5 | 7.5 | 7.5 | 7.5 |
| Pigment weight concentration (%) of carbon black pigment in the third colored paint (X) | 1.48 | 1.48 | 1.48 | 1.96 | 1.48 | 1.48 | 0.99 | 0.99 | 0.99 |
| Value obtained by multiplying the thickness (μm) of the third colored coating film on a cured film basis by the pigment weight concentration (%) of the carbon black pigment in the third colored paint (X) | 11.1 | 11.1 | 11.1 | 14.7 | 11.1 | 11.1 | 7.4 | 7.4 | 7.4 |
| Lightness $L^*(45°)$ | 1.2 | 1.1 | 1.3 | 0.8 | 1.2 | 1.1 | 1.7 | 1.6 | 1.5 |
| Chroma $C^*(45°)$ | 0.3 | 0.2 | 0.3 | 0.2 | 0.4 | 0.3 | 0.4 | 0.5 | 0.5 |
| Diffuse reflectance (%) at a wavelength of 905 nm | 16 | 15 | 17 | 11 | 15 | 14 | 12 | 12 | 6 |
| Diffuse reflectance (%) at a wavelength of 1550 nm | 19 | 19 | 21 | 13 | 18 | 18 | 14 | 18 | 26 |
| Anti-water adhesion | A | B | A | A | A | A | A | A | A |

| | Comparative Examples | | | | | | | |
|---|---|---|---|---|---|---|---|---|
| | 1 | 2 | 3 | 4 | 5 | 6 | 7 | 8 |
| First colored paint | V-1 | V-1 | V-1 | V-1 | V-1 | V-1 | V-1 | V-5 |
| Second colored paint | W-6 | W-6 | W-11 | W-6 | W-6 | W-13 | W-12 | W-6 |
| Thickness (μm) of the second colored coating film on a cured film basis | 7.5 | 7.5 | 7.5 | 7.5 | 7.5 | 7.5 | 7.5 | 7.5 |
| Third colored paint | X-9 | X-7 | X-8 | X-5 | X-6 | X-4 | X-4 | X-2 |
| Thickness (μm) of the third colored coating film on a cured film basis | 7.5 | 7.5 | 7.5 | 7.5 | 7.5 | 7.5 | 7.5 | 7.5 |
| Pigment weight concentration (%) of the carbon black pigment in the third colored paint (X) | 0 | 0 | 0 | 0.25 | 2.91 | 1.96 | 1.96 | 0.99 |
| Value obtained by multiplying the thickness (μm) of the third colored coating film on a cured film basis by the pigment weight concentration (%) of the carbon black pigment in the third colored paint (X) | 0 | 0 | 0 | 1.9 | 21.8 | 14.7 | 14.7 | 7.4 |
| Lightness $L^*(45°)$ | 4.1 | 4.1 | 4.0 | 3.3 | 0.6 | 2.6 | 4.2 | 1.4 |
| Chroma $C^*(45°)$ | 1.4 | 1.3 | 1.2 | 1.2 | 0.1 | 0.5 | 1.0 | 0.4 |
| Diffuse reflectance (%) at a wavelength of 905 nm | 65 | 63 | 60 | 50 | 4 | 2 | 12 | 7 |
| Diffuse reflectance (%) at a wavelength of 1550 nm | 40 | 41 | 38 | 35 | 6 | 3 | 14 | 8 |
| Anti-water adhesion | A | C | D | A | A | A | A | A |

TABLE 8

| | Examples | | |
|---|---|---|---|
| | 19 | 20 | 21 |
| First colored paint | V-1 | V-1 | V-1 |
| Second colored paint | W-3 | W-5 | W-10 |
| Thickness (μm) of the second colored coating film on a cured film basis | 15 | 15 | 15 |
| Color clear paint | Z-1 | Z-1 | Z-2 |
| Thickness (μm) of color clear coating film on a cured film basis | 30 | 30 | 30 |
| Pigment weight concentration (%) of carbon black pigment in color clear paint (Z) | 0.40 | 0.40 | 0.20 |
| Value obtained by multiplying the thickness (μm) of color clear coating film on a cured film basis by the pigment weight concentration (%) of the carbon black pigment in the color clear paint (Z) | 12.0 | 12.0 | 6.0 |
| Lightness $L^*$ (45°) | 1.2 | 1.1 | 1.8 |
| Chroma $C^*$ (45°) | 0.1 | 0.2 | 0.7 |
| Diffuse reflectance (%) at a wavelength of 905 nm | 14 | 15 | 16 |
| Diffuse reflectance (%) at a wavelength of 1550 nm | 17 | 18 | 18 |
| Anti-water adhesion | A | A | A |

The invention claimed is:

1. A method for forming a multilayer coating film, the method comprising
    step (1): applying a titanium oxide pigment-containing first colored paint (V) to form a first colored coating film, in which the diffuse reflectance at a wavelength of 905 nm or diffuse reflectance at a wavelength of 1550 nm, or both, is 40% or more,
    step (2): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film,
    step (3): applying a third colored paint (X) containing a carbon black pigment to the second colored coating film to form a third colored coating film,
    step (4): applying a clear paint (Y) to the third colored coating film to form a clear coating film, and
    step (5): heating the first colored coating film formed in step (1), the second colored coating film formed in step (2), the third colored coating film formed in step (3), and the clear coating film formed in step (4) separately or simultaneously to cure these films,
        wherein the multilayer coating film has a lightness) L*(45°) of 3 or less,
        the multilayer coating film has a chroma C*(45°) of 1 or less, and
        the diffuse reflectance at a wavelength of 905 nm or the diffuse reflectance at a wavelength of 1550 nm of the multilayer coating film, or both, is 10% or more.

2. A method for forming a multilayer coating film, the method comprising
    step (6): applying a titanium oxide pigment-containing first colored paint (V) to form a first colored coating film, in which the diffuse reflectance at a wavelength of 905 nm or diffuse reflectance at a wavelength of 1550 nm, or both, is 40% or more,
    step (7): applying a second colored paint (W) containing at least one pigment selected from the group consisting of (A1) a perylene black pigment, (A2) a black metal oxide complex pigment, and (A3) two or more pigments selected from the group consisting of blue pigments, red pigments, yellow pigments, and green pigments to the first colored coating film to form a second colored coating film,
    step (8): applying a color clear paint (Z) containing a carbon black pigment to the second colored coating film to form a color clear coating film, and
    step (9): heating the first colored coating film formed in step (6), the second colored coating film formed in step (7), and the color clear coating film famed in step (8) separately or simultaneously to cure these films,
        wherein the multilayer coating film has a lightness) L*(45°) of 3 or less,
        the multilayer coating film has a chroma C*(45°) of 1 or less, and
        the diffuse reflectance at a wavelength of 905 nm or the diffuse reflectance at a wavelength of 1550 nm of the multilayer coating film, or both, is 10% or more.

3. The method for forming a multilayer coating film according to claim 1, wherein a value obtained by multiplying the thickness (μm) of the third colored coating film on a cured film basis by the pigment weight concentration (%) of the carbon black pigment in the third colored paint (X) is 2.5 to 20.

4. The method for forming a multilayer coating film according to claim 2, wherein a value obtained by multiplying the thickness (μm) of the color clear coating film on a cured film basis by the pigment weight concentration (%) of the carbon black pigment in the color clear paint (Z) is 2.5 to 20.

5. The method for forming a multilayer coating film according to claim 1, wherein the first colored coating film has a lightness L*(45°) of 55 or more.

6. The method for forming a multilayer coating film according to claim 1, wherein the second colored paint (W) contains the perylene black pigment (A1), and the pigment weight concentration of the perylene black pigment (A1) is 3 to 30%.

7. The method for forming a multilayer coating film according to claim 1, wherein the second colored paint (W) contains the black metal oxide complex pigment (A2), and the pigment weight concentration of the black metal oxide complex pigment (A2) is 5 to 50%.

8. The method for forming a multilayer coating film according to claim 1, wherein the second colored paint (W) contains the two or more pigments (A3) selected from the group consisting of blue pigments, red pigments, yellow pigments, and green pigments, and the pigment weight concentration of the two or more pigments (A3) selected from the group consisting of blue pigments, red pigments, yellow pigments, and green pigments is 3 to 30%.

9. The method for forming a multilayer coating film according to claim 2, wherein the first colored coating film has a lightness L*(45°) of 55 or more.

10. The method for forming a multilayer coating film according to claim 2, wherein the second colored paint (W) contains the perylene black pigment (A1), and the pigment weight concentration of the perylene black pigment (A1) is 3 to 30%.

11. The method for forming a multilayer coating film according to claim 2, wherein the second colored paint (W) contains the black metal oxide complex pigment (A2), and the pigment weight concentration of the black metal oxide complex pigment (A2) is 5 to 50%.

12. The method for forming a multilayer coating film according to claim 2, wherein the second colored paint (W) contains the two or more pigments (A3) selected from the group consisting of blue pigments, red pigments, yellow pigments, and green pigments, and the pigment weight concentration of the two or more pigments (A3) selected from the group consisting of blue pigments, red pigments, yellow pigments, and green pigments is 3 to 30%.

* * * * *